US012585166B2

(12) United States Patent
Smirnov

(10) Patent No.: US 12,585,166 B2
(45) Date of Patent: Mar. 24, 2026

(54) CAMERA MODULE INCLUDING ROTATING FIRST AND SECOND FRAMES

(71) Applicant: SAMSUNG ELECTRO-MECHANICS CO., LTD., Suwon-si (KR)

(72) Inventor: Viatcheslav Smirnov, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 193 days.

(21) Appl. No.: 18/539,922

(22) Filed: Dec. 14, 2023

(65) Prior Publication Data

US 2024/0288750 A1     Aug. 29, 2024

(30) Foreign Application Priority Data

Feb. 23, 2023     (KR) ........................ 10-2023-0024054

(51) Int. Cl.
*G03B 5/00*                (2021.01)

(52) U.S. Cl.
CPC ........ *G03B 5/00* (2013.01); *G03B 2205/0069* (2013.01)

(58) Field of Classification Search
CPC .... G03B 5/00; G03B 2205/0069; G03B 3/10; G03B 30/00; G03B 13/36; G03B 2205/0007; G03B 17/12; H02K 33/18; G02B 7/09; H04N 23/54; H04N 23/55; H04N 23/57; H04N 23/687
See application file for complete search history.

(56) References Cited

U.S. PATENT DOCUMENTS

| | | | |
|---|---|---|---|
| 9,933,629 B2 | 4/2018 | Minamisawa | |
| 2021/0250475 A1* | 8/2021 | Jeong ..................... | H04N 23/57 |
| 2022/0003958 A1* | 1/2022 | Jeong ..................... | H04N 23/55 |
| 2022/0070341 A1 | 3/2022 | Seo et al. | |

(Continued)

FOREIGN PATENT DOCUMENTS

| | | |
|---|---|---|
| CN | 111158104 A | 5/2020 |
| KR | 10-1031857 B1 | 5/2011 |

(Continued)

OTHER PUBLICATIONS

Korean Office Action issued on Aug. 12, 2024, in counterpart Korean Patent Application No. 10-2023-0024054 (6 pages in English, 5 pages in Korean).

*Primary Examiner* — Gevell V Selby
(74) *Attorney, Agent, or Firm* — NSIP Law

(57)                ABSTRACT

A camera module is provided. The camera module includes a housing, a fixed member fixedly disposed on the housing, a first frame rotatably disposed on the fixed member, a second frame rotatably disposed on the first frame, a lens barrel disposed on the second frame, a first driving unit including a first magnet disposed on one of the housing and the first frame and a first coil disposed to face the first magnet, and a second driving unit including a second magnet installed on one of the housing and the second frame and a second coil disposed to face the second magnet, wherein the first frame is configured to rotate in a first axial direction, perpendicular to an incident direction of light incident on the lens barrel, and the second frame is configured to rotate in a second axial direction, perpendicular to the first axial direction.

19 Claims, 12 Drawing Sheets

(56)  References Cited

U.S. PATENT DOCUMENTS

| | | | |
|---|---|---|---|
| 2022/0086311 A1 | 3/2022 | Jun | |
| 2022/0171150 A1* | 6/2022 | Wang | G02B 27/646 |
| 2022/0182512 A1* | 6/2022 | Ni | H04N 23/51 |
| 2022/0236518 A1 | 7/2022 | Smirnov | |

FOREIGN PATENT DOCUMENTS

| | | |
|---|---|---|
| KR | 10-2234859 B1 | 4/2021 |
| KR | 10-2022-0033058 A | 3/2022 |
| KR | 10-2022-0037266 A | 3/2022 |
| KR | 10-2022-0106547 A | 7/2022 |

* cited by examiner

CAMERA MODULE INCLUDING ROTATING FIRST AND SECOND FRAMES

CROSS-REFERENCE TO RELATED APPLICATIONS

This application claims the benefit under 35 USC § 119 (a) of Korean Patent Application No. 10-2023-0024054 filed on Feb. 23, 2023, in the Korean Intellectual Property Office, the entire disclosure of which is incorporated herein by reference for all purposes.

BACKGROUND

1. Field

The following description relates to a camera module.

2. Description of Related Art

Cameras have been implemented in portable electronic devices, such as, but not limited to, smartphones, tablet personal computers (PCs), and laptops, and an autofocus (AF) operation, an optical image stabilization (OIS) operation, and a zoom operation have been added to cameras for mobile terminals.

However, in order to implement various operations, camera modules have been complicated in structure and have increased in size, and accordingly, portable electronic devices on which the camera modules are mounted have also increased in size.

In accordance with the growth of the smartphone camera market, attempts have been continuously made to miniaturize and integrate the operations of typical manual cameras, such as AF operations and optical zoom operations along with an OIS driving method, and in line with structural diversification, there is demand for an OIS driving method other than the existing OIS method.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a housing; a fixed member fixedly disposed on the housing; a first frame rotatably disposed on the fixed member; a second frame rotatably disposed on the first frame; a lens barrel disposed on the second frame; a first driving unit comprising a first magnet, disposed on one of the housing and the first frame, and a first coil disposed to face the first magnet; and a second driving unit comprising a second magnet, disposed on one of the housing and the second frame, and a second coil disposed to face the second magnet, wherein the first frame is configured to rotate in a first axial direction, perpendicular to an incident direction of light incident on the lens barrel, and the second frame is configured to rotate in a second axial direction, perpendicular to the first axial direction.

The first frame may be rotatably disposed on the fixed member via a first rotating shaft, and the first rotating shaft is disposed on a first sidewall of the first frame and a second sidewall of the first frame facing the first sidewall of the first frame.

The second frame may be rotatably disposed on the first frame via a second rotating shaft, and the second rotating shaft may be disposed on a sidewall disposed adjacent to the first sidewall of the first frame on which the first rotating shaft is disposed, among four sidewalls of the first frame.

The housing may have a quadrangular frame shape.

The first frame may include a first magnet installation portion that extends into a space between the housing and the fixed member, and the first magnet of the first driving unit may be disposed on an outer surface of the first magnet installation portion, and the first coil of the first driving unit may be disposed on an inner surface of the housing.

The second frame may include a second magnet installation portion that extends into a space between the housing and the fixed member, and the second magnet of the second driving unit may be disposed on an outer surface of the second magnet installation portion, and the second coil of the second driving unit is disposed on the inner surface of the housing.

The first magnet installation portion and the second magnet installation portion may be disposed on the inner surfaces of the housing, and are disposed to be adjacent to each other.

The first frame may be rotatably installed on the fixed member via a first rotating shaft, and the first rotating shaft may be installed at two facing corners, among four corners of the first frame.

The second frame may be rotatably installed on the first frame via a second rotating shaft, and the second rotating shaft may be installed at corners excluding the two facing corners, among the four corners of the first frame.

The housing may have a quadrangular frame shape.

The first frame may include a first magnet installation portion that extends into a space between the housing and the fixed member, and the first magnet installation portion may include a 1-1 magnet installation portion that extends from a first sidewall of the first frame, and a 1-2 magnet installation portion that extends from a sidewall disposed adjacent to the first sidewall of the first frame.

The first magnet may include a 1-1 magnet disposed in the 1-1 magnet installation portion and a 1-2 magnet disposed in the 1-2 magnet installation portion, and the first coil may include a 1-1 coil disposed to face the 1-1 magnet and a 1-2 coil disposed to face the 1-2 magnet.

The second frame may include a second magnet installation portion that extends into a space between the housing and the fixed member, and the second magnet installation portion may include a 2-1 magnet installation portion that extends from a first sidewall of the second frame and a 2-2 magnet installation portion that extends from a sidewall disposed adjacent to the first sidewall of the second frame.

The second magnet may include a 2-1 magnet disposed in the 2-1 magnet installation portion and a 2-2 magnet disposed in the 2-2 magnet installation portion, and the second coil may include a 2-1 coil disposed to face the 2-1 magnet and a 2-2 coil disposed to face the 2-2 magnet.

The first rotating shaft may include a 1-1 shaft disposed on the fixed member, a 1-2 shaft disposed on the first frame, and a first ball disposed between the 1-1 shaft and the 1-2 shaft.

The second rotating shaft may include a 2-1 shaft disposed on the first frame, a 2-2 shaft disposed on the second frame, and a second ball disposed between the 2-1 shaft and the 2-2 shaft.

An electronic device may include the camera module.

In a general aspect, a camera module includes a housing; a first frame, configured to tilt in a first direction; a second frame, configured to tilt in a second direction perpendicular to the first direction; a lens barrel, fixed to the second frame, and configured to rotate with the second frame; a first driving unit configured to tilt the first frame in the first direction, and comprising a first magnet disposed on the first frame, and a first coil disposed on the housing; and a second driving unit, configured to tilt the second frame in the second direction and comprising a second magnet disposed on the second frame, and a second coil disposed on the housing.

Other features and aspects will be apparent from the following detailed description, the drawings, and the claims.

Figure 1:
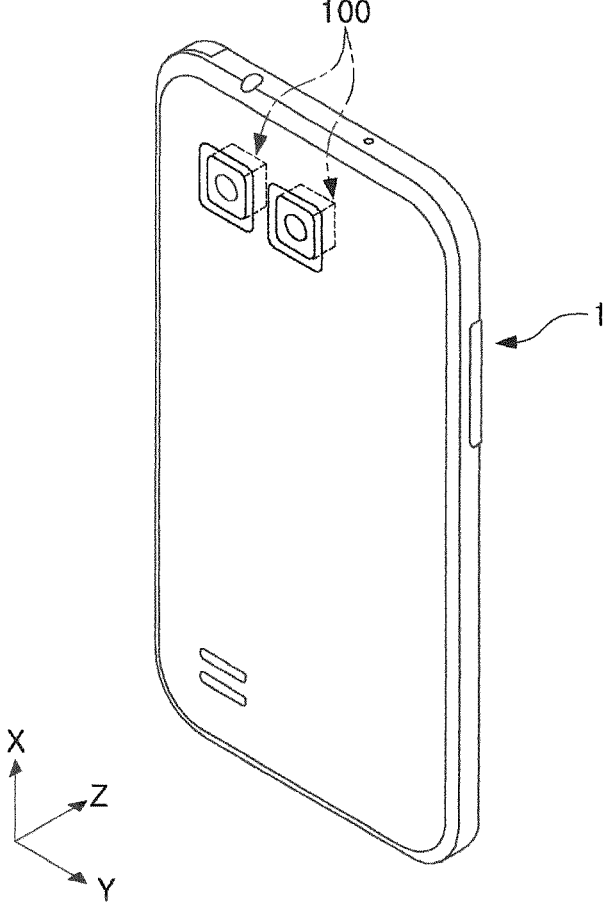
FIG. 1 illustrates a perspective view of an example portable electronic device, in accordance with one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a,""an," and "the" are intended to include the plural forms as well, unless the context clearly indicates otherwise. As used herein, the term "and/or" includes any one and any combination of any two or more of the associated listed items. As non-limiting examples, terms "comprise" or "comprises,""include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises,""include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to,""coupled to," or "joined to" another component, element, or layer it may be directly (e.g., in contact with the other component, element, or layer) "on", "connected to,""coupled to," or "joined to" the other component, element, or layer or there may reasonably be one or more other components, elements, layers intervening therebetween. When a component, element, or layer is described as being "directly on", "directly connected to,""directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first,""second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

One or more examples provide a camera module which has a miniaturized form factor.

One or more examples also provide a camera module which reduces manufacturing costs and improves manufacturing efficiency.

FIG. 1 illustrates a perspective view of an example portable electronic device, in accordance with one or more embodiments.

Referring to FIG. 1, an example portable electronic device 1 may be a portable electronic device, such as, but not limited to, a mobile communication terminal, a smartphone, or a tablet PC, which is equipped with a camera module 100.

As shown in FIG. 1, two or more camera modules 100 may be mounted in the portable electronic device 1 to image a subject.

In the example, an optical axis (Z-axis) of a plurality of lenses provided in the two camera modules 100 may be formed in a thickness direction (Z-axis direction) of the portable electronic device 1.

In an example, the example camera module 100 may include at least one of an autofocusing (AF), operation, a zoom operation, and an OIS operation.

Since the camera module 100 implementing the AF operation, the zoom operation, and the OIS operation may be provided with various parts, a size of the camera module may increase, compared to typical camera modules.

However, since the example camera module 100 has a simplified structure, an increase in size thereof may be suppressed. This will be described in detail below.

Figure 2:
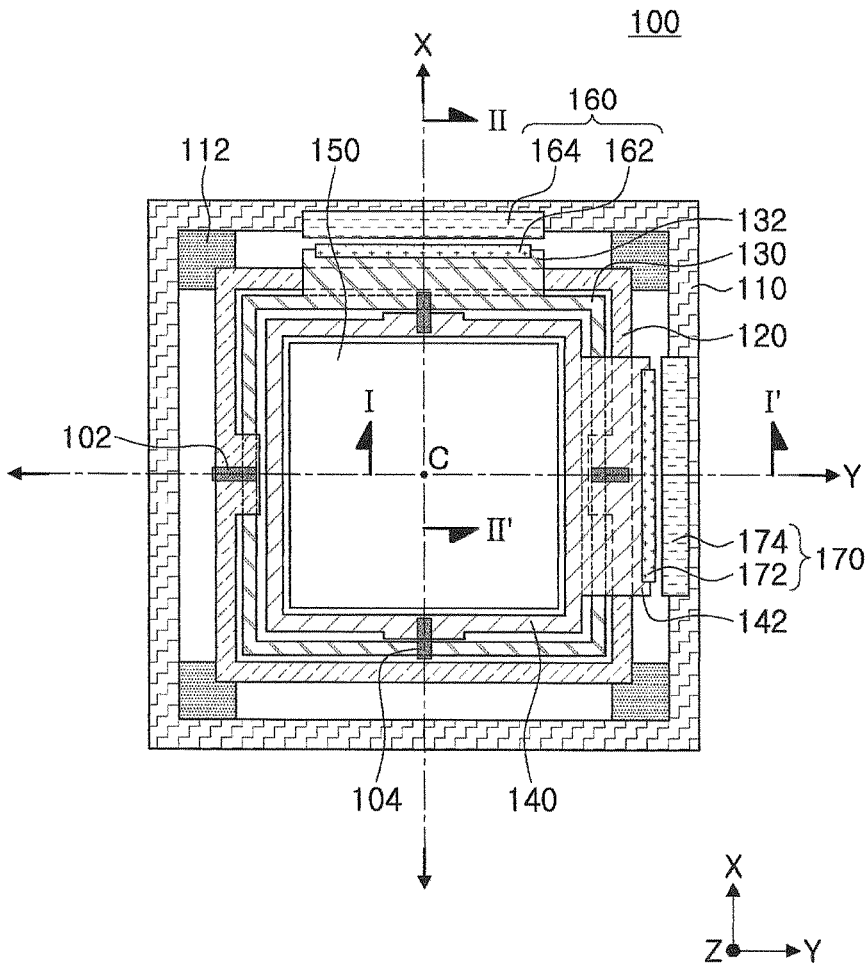
FIG. 2 is a schematic plan diagram illustrating an example camera module, in accordance with one or more embodiments.
Figure 3:
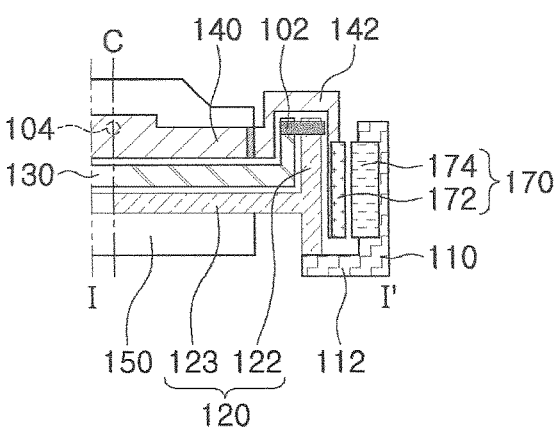
FIG. 3 illustrates a schematic cross-sectional view taken along line I-I' of FIG. 2.
Figure 4:
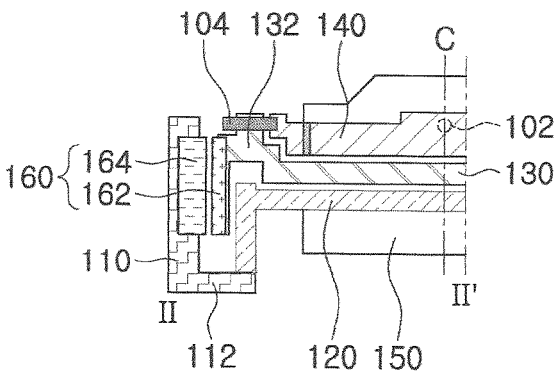
FIG. 4 illustrates a cross-sectional configuration diagram taken along line II-II' of FIG. 2.

FIG. 2 is a planar configuration diagram illustrating an example camera module, in accordance with one or more embodiments, FIG. 3 is a cross-sectional configuration diagram taken along line I-I' in FIG. 2, and FIG. 4 is a cross-sectional configuration diagram taken along line II-II' of FIG. 2.

Referring to FIGS. 2 to 4, the example camera module 100, in accordance with one or more embodiments, may include a housing 110, a fixed member 120, a first frame 130, a second frame 140, a lens barrel 150, a first driving unit 160, and a second driving unit 170.

The housing 110 may have a substantially quadrangular frame shape. In an example, some components of the first driving unit 160 and the second driving unit 170 to be described below may be fixedly installed on an inner surface of the housing 110. Additionally, an extension 112 extending inwardly, on which the fixed member 120 is seated, may be provided at the corner of the housing 110. In this manner, the fixed member 120 may be seated on the extension 112 of the housing 110 and fixed to the housing 110.

The fixed member 120 may be fixedly installed or disposed on the housing 110. As an example, the fixed member 120 may have a quadrangular frame shape to correspond to the shape of the housing 110 as shown in FIG. 2. In an example, a first rotating shaft 102 that rotates the first frame 130 may be installed or disposed in the fixed member 120. Accordingly, the first frame 130 may rotate about the first rotating shaft 102, that is, around the Y-axis of FIG. 2. In an example, as shown in FIG. 3, the fixed member 120 may include an installation portion 122 for installation of the first rotating shaft 102. The installation portion 122 may extend upwardly from a body 123 of the fixed member 120.

The first frame 130 may be rotatably installed on the fixed member 120. As an example, the first frame 130 may be installed on the fixed member 120 via the first rotating shaft 102, and may rotate around the Y-axis of FIG. 2. In an example, the first frame 130 may be disposed inside the fixed member 120 and may have a shape corresponding to the shape of the fixed member 120. Additionally, the first frame 130 may include a first magnet installation portion 132 extending into a space between the housing 110 and the fixed member 120. The first magnet installation portion 132 may be formed to extend from one of four sidewalls of the first frame 130.

The second frame 140 may be rotatably installed on the first frame 130. In an example, the second frame 140 may be installed on the first frame 130 via a second rotating shaft 104, and may rotate about the X-axis of FIG. 2. In an example, the second frame 140 may be disposed inside the first frame 130, and may have a shape corresponding to a shape of the first frame 130. In an example, the second frame 140 may include a second magnet installation portion 142 extending into a space between the housing 110 and the fixed member 120. The second magnet installation portion 142 may be formed to extend from one of four sidewalls of the second frame 140. Meanwhile, the second frame 140 rotates together with the first frame 130 when the first frame 130 rotates.

The lens barrel 150 may be fixed to the second frame 140, and may rotate in conjunction with the second frame 140. In an example, at least one lens (not shown) may be installed in the lens barrel 150. As an example, the lens barrel 150 may have a cylindrical shape in which a plurality of lenses (not shown) are installed in an internal space. Also, an infrared (IR) filter (not shown) may be disposed at a lower end of the lens barrel 150.

The first driving unit 160 may include a first magnet 162 installed on either one of the housing 110 and the first frame 130 and a first coil 164 disposed to face the first magnet 162. As an example, the first magnet 162 may be installed on the first magnet installation portion 132 of the first frame 130, and the first coil 164 may be installed on an inner surface of the housing 110 and may be disposed to face the first magnet 162. Accordingly, when power is supplied to the first coil 164, the first frame 130 may rotate about the Y-axis. An example in which the first magnet 162 is installed on the first frame 130 is described as an example, but is not limited thereto, and the first magnet 162 may be installed in a region facing the first frame 130. In this example, the first coil 164 may be installed on the first frame 130. In an example, the first driving unit 160 may further include a yoke (not shown) that improves electromagnetic force between the first magnet 162 and the first coil 164.

The second driving unit 170 may include a second magnet 172 installed on either one of the housing 110 and the second frame 140, and a second coil 174 disposed to face the second magnet 172. In an example, the second magnet 172 may be installed on the second magnet installation portion 142 of the second frame 140, and the second coil 174 may be installed on the inner surface of the housing 110 to face the second magnet 172. Accordingly, when power is supplied to the second coil 174, the second frame 140 may rotate about the X-axis. An example in which the second magnet 172 is installed on the second frame 140 is described as an example, but is not limited thereto, and the second magnet 172 may be installed in a region facing the second frame 140. In this example, the second coil 174 may be installed on the second frame 140.

In an example, the second coil 174 may be installed on an inner surface of the housing 110 adjacent to the inner surface on which the first coil 172 is installed.

Additionally, the second driving unit 170 may further include a yoke (not shown) that improves an electromagnetic force between the first magnet 172 and the first coil 174.

As described above, the first frame 130 rotates about the first rotating shaft 102 and the second frame 140 rotates about the second rotating shaft 104 to perform the OIS operation and the AF operation. Therefore, the camera module 100, which is structurally simple and performs the OIS operation and the AF operation may be provided. Furthermore, since the camera module 100 has a simple structure, manufacturing yield and manufacturing costs thereof may be reduced.

Hereinafter, an example camera module, in accordance with one or more embodiments will be described with reference to the drawings.

Figure 5:
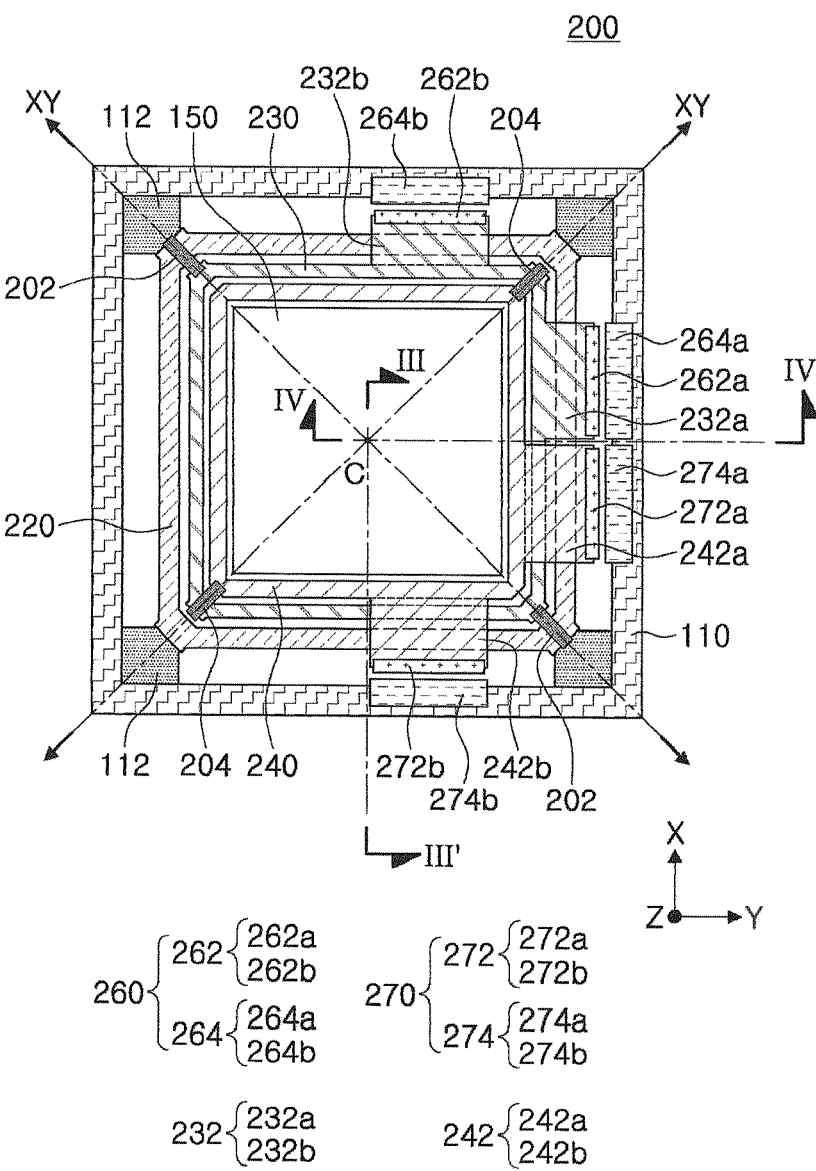
FIG. 5 is a schematic plan diagram illustrating an example camera module, in accordance with one or more embodiments.
Figure 6:
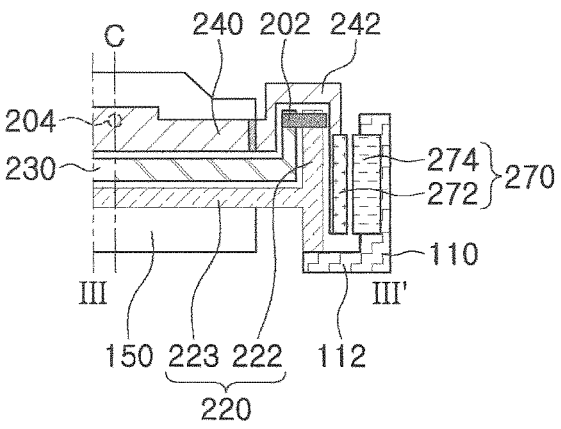
FIG. 6 illustrates a cross-sectional configuration diagram taken along line III-III' of FIG. 5.
Figure 7:
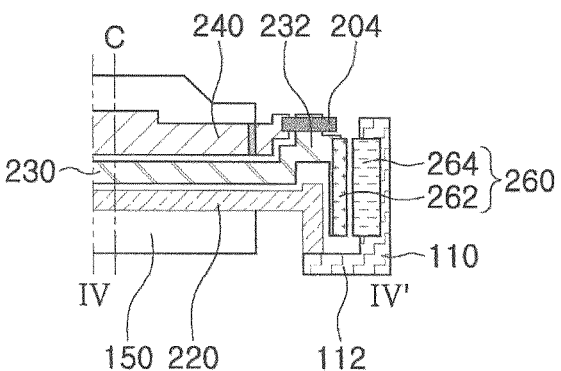
FIG. 7 illustrates a cross-sectional view taken along line IV-IV' of FIG. 5.

FIG. 5 is a schematic plan diagram illustrating an example camera module, in accordance with one or more embodiments, FIG. 6 is a cross-sectional configuration diagram taken along line III-III' of FIG. 5, and FIG. 7 is a cross-sectional view taken along line IV-IV' of FIG. 5.

Referring to FIGS. 5 to 7, the example camera module 200 may include the housing 110, a fixed member 220, a first frame 230, a second frame 240, the lens barrel 150, a first driving unit 260, and a second driving unit 270.

In an example, since the configuration of the housing 110 and the lens barrel 150 is substantially the same as that described above, a detailed description thereof will be omitted and the above description will be substituted.

The fixed member 220 may be fixedly installed on the housing 110. As an example, the fixed member 220 may have a quadrangular frame shape corresponding to the shape of the housing 110 as shown in FIG. 5. In an example, a first rotating shaft 202 that rotates the first frame 230 may be installed in the fixed member 220. In an example, the first rotating shaft 202 may be disposed at two facing corners among four corners of the fixed member 220. Accordingly, the first frame 230 may rotate about the first rotating shaft 202, that is, around an X-Y axis of FIG. 5. In an example, as shown in FIG. 6, the fixed member 220 may include an installation portion 222 for installation of the first rotating shaft 202. The installation portion 222 may extend upwardly from a body 223 of the fixed member 220.

The first frame 230 may be rotatably installed on the fixed member 220. As an example, the first frame 230 may be installed on the fixed member 220 via the first rotating shaft 202, and may rotate about the X-Y axis of FIG. 5. Additionally, as described above, the first rotating shaft 202 may be disposed at two facing corners among the four corners of the first frame 230. In an example, the first frame 230 may be disposed inside the fixed member 220, and may have a shape corresponding to the shape of the fixed member 220. Additionally, the first frame 230 may include a first magnet installation portion 232 extending into a space between the housing 110 and the fixed member 220. The first magnet installation portion 232 may include a 1-1 magnet installation portion 232a extending from one sidewall of the first frame 230 and a 1-2 magnet installation portion 232b extending from a sidewall disposed to be adjacent to one sidewall of the first frame 230.

The second frame 240 may be rotatably installed on the first frame 230. In an example, the second frame 240 may be installed on the first frame 230 via a second rotating shaft 204, and may rotate about the X-Y axis of FIG. 5.

Additionally, the second rotating shaft 204 may be disposed at two corners at which the first rotating shaft 202 is not disposed. In an example, the second frame 240 may be disposed inside the first frame 230, and may have a shape corresponding to a shape of the first frame 230.

In an example, the second frame 240 may include a second magnet installation portion 242 extending into a space between the housing 110 and the fixed member 220. The second magnet installation portion 242 may include a 2-1 magnet installation portion 242a extending from one sidewall of the second frame 240, and a 2-2 magnet installation portion 242b extending from a sidewall disposed adjacent to one sidewall of the second frame. As an example, the 2-1 magnet installation portion 242a and the 1-1 magnet installation portion 232a may be disposed to be adjacent to each other, and the 2-2 magnet installation portion 242b and the 1-2 magnet installation portion 232b may be arranged to face each other. In an example, the second frame 240 may rotate together with the first frame 230 when the first frame 230 rotates.

The first driving unit 260 includes a first magnet 262 installed on either one of the housing 110 and the first frame 230 and a first coil 264 disposed to face the first magnet 262. As an example, the first magnet 262 may be installed on the first magnet installation portion 232 of the first frame 230, and the first coil 264 may be disposed on an inner surface of the housing 110 and facing the first magnet 262. That is, the first magnet 262 includes the 1-1 magnet 262a installed on the 1-1 magnet installation portion 232*a* and the 1-2 magnet 262*b* installed on the 1-2 magnet installation portion 232*b*.

Additionally, the first coil 264 may include a 1-1 coil 264*a* disposed to face the 1-1 magnet 262*a,* and a 1-2 coil 264*b* disposed to face the 1-2 magnet 262*b*. Accordingly, when power is supplied to the first coil 264, the first frame 230 may rotate about the X-Y axis. An example in which the first magnet 262 is installed on the first frame 230 is described as an example, but is not limited thereto, and the first magnet 262 may be installed in a region facing the first frame 230. In this example, the first coil 264 may be installed on the first frame 230. In an example, the first driving unit 260 may further include a yoke (not shown) that improves electromagnetic force between the first magnet 262 and the first coil 264.

The second driving unit 270 may include a second magnet 272 installed on either one of the housing 110 and the second frame 240, and a second coil 274 disposed to face the second magnet 272. As an example, the second magnet 272 may be installed on the second magnet installation portion 242 of the second frame 240, and the second coil 274 may be disposed inside the housing 110 and facing the second magnet 272. That is, the second magnet 272 may include a 2-1 magnet 272*a* installed in the 2-1 magnet installation portion 242*a,* and a 2-2 magnet 272*b* installed in the 2-2 magnet installation portion 242*b*.

Additionally, the second coil 274 may include a 2-1 coil 274*a* disposed to face the 2-1 magnet 272*a,* and a 2-2 coil 274*b* disposed to face the 2-2 magnet 272*b*. Accordingly, when power is supplied to the second coil 274, the second frame 240 may rotate about the X-Y axis. An example in which the second magnet 272 is installed in the second frame 240 is described as an example, but is not limited thereto, and the second magnet 272 may be installed in a region facing the second frame 240. In this example, the second coil 274 may be installed on the second frame 240. Additionally, the second driving unit 270 may further include a yoke (not shown) that improves an electromagnetic force between the first magnet 272 and the first coil 274.

Figure 8:
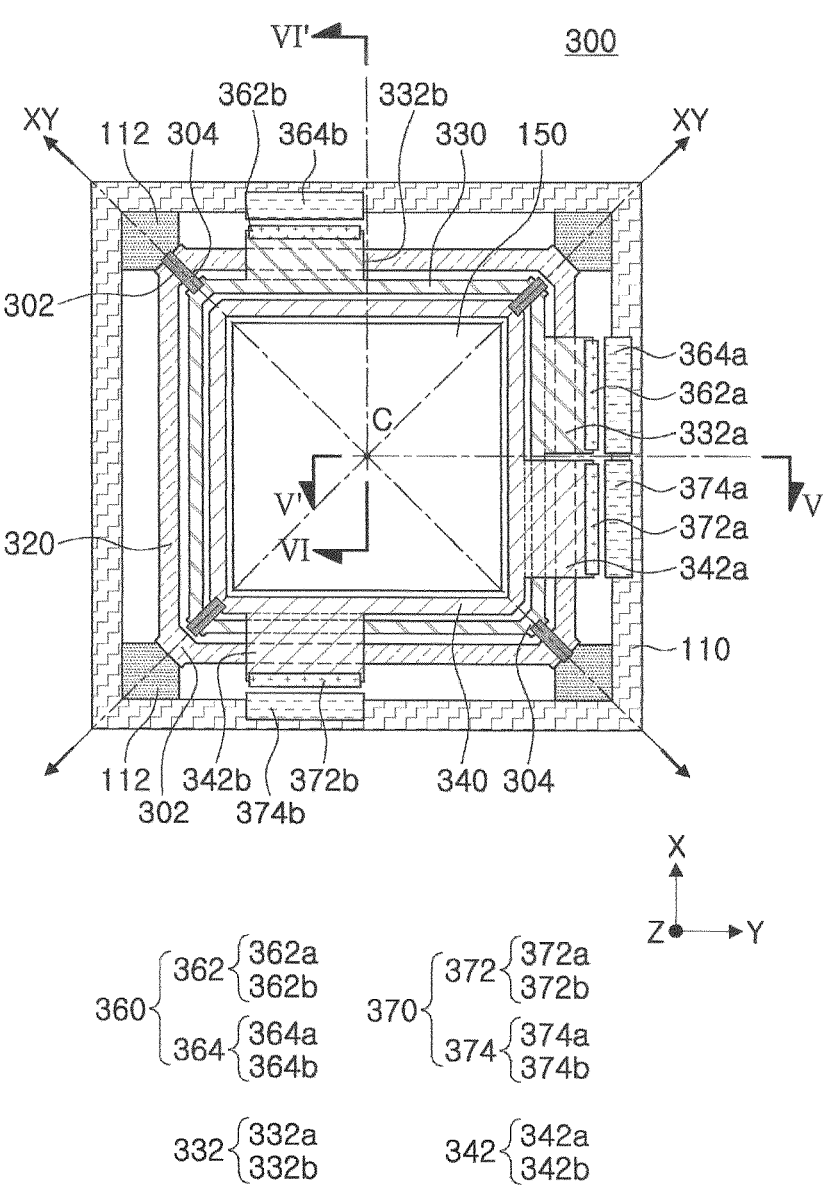
FIG. 8 is a schematic plan diagram illustrating an example camera module, in accordance with one or more embodiments.
Figure 9:
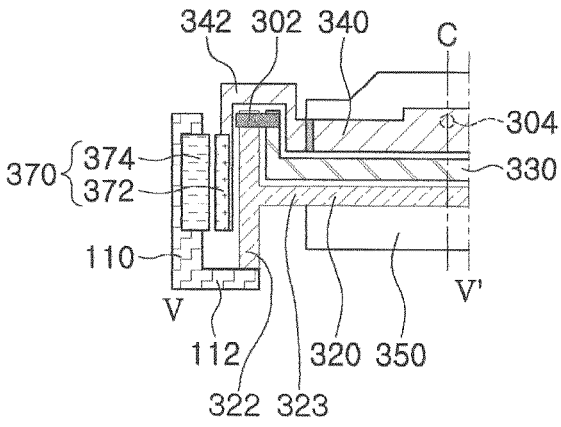
FIG. 9 illustrates a cross-sectional view taken along line V-V' of FIG. 8.
Figure 10:
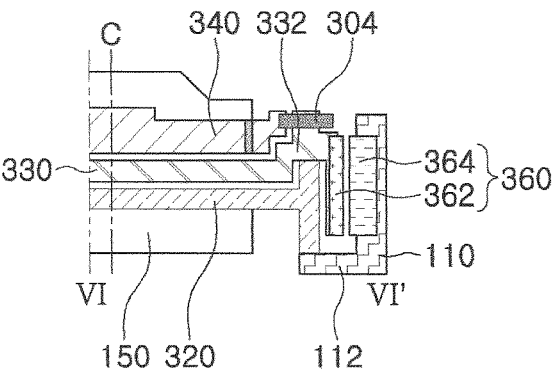
FIG. 10 illustrates a cross-sectional view taken along line VI-VI' of FIG. 8.

FIG. 8 is a schematic plan diagram illustrating an example camera module, in accordance with one or more embodiments, FIG. 9 is a cross-sectional view taken along line V-V' of FIG. 8, and FIG. 10 is a cross-sectional view taken along line VI-VI' of FIG. 8.

Referring to FIGS. 8 to 10, an example camera module 300, in accordance with one or more embodiments, may include the housing 110, a fixed member 320, a first frame 330, a second frame 340, the lens barrel 150, a first driving unit 360, and a second driving unit 370.

In an example, since the configuration of the housing 110 and the lens barrel 150 is substantially the same as that described above, a detailed description thereof will be omitted and the above description will be substituted.

The fixed member 320 may be fixedly installed to the housing 110. As an example, the fixed member 320 may have a quadrangular frame shape corresponding to the shape of the housing 110 as shown in FIG. 8. In an example, a first rotating shaft 302 that rotates the first frame 330 may be installed in the fixed member 320. In an example, the first rotating shaft 302 may be disposed at two facing corners among four corners of the fixed member 320. Accordingly, the first frame 330 may rotate about the first rotating shaft 302, that is, around the X-Y axis of FIG. 8. In an example, as shown in FIG. 9, the fixed member 320 may include an installation portion 322 for installation of the first rotating shaft 302. The installation portion 322 may extend upwardly from a body 323 of the fixed member 320.

The first frame 330 may be rotatably installed on the fixed member 320. As an example, the first frame 330 may be installed on the fixed member 320 via the first rotating shaft 302, and may rotate around the X-Y axis of FIG. 8. Additionally, as described above, the first rotating shaft 302 may be disposed at two facing corners among the four corners of the first frame 330. In an example, the first frame 330 may be disposed inside the fixed member 320, and may have a shape corresponding to the shape of the fixed member 320.

Additionally, the first frame 330 may include a first magnet installation portion 332 extending into a space between the housing 110 and the fixed member 320. The first magnet installation portion 332 may include a 1-1 magnet installation portion 332*a* extending from one sidewall of the first frame 330 and a 1-2 magnet installation portion 332*b* extending from a sidewall disposed to be adjacent to the one sidewall of the first frame 300.

The second frame 340 may be rotatably installed on the first frame 330. As an example, the second frame 340 may be installed on the first frame 330 via the second rotating shaft 304, and may rotate around the X-Y axis of FIG. 8. Additionally, the second rotating shaft 304 may be disposed at two corners at which the first rotating shaft 302 is not disposed. In an example, the second frame 340 may be disposed inside the first frame 330 and may have a shape corresponding to a shape of the first frame 330. In an example, the second frame 340 may include a second magnet installation portion 342 extending into a space between the housing 110 and the fixed member 320. Additionally, the second magnet installation portion 342 may include a 2-1 magnet installation portion 342*a* extending from one sidewall of the second frame 340 and a 2-2 magnet installation portion 342*b* extending from a sidewall disposed to be adjacent to the one sidewall of the second frame 340. As an example, the 2-1 magnet installation portion 342*a* and the 1-1 magnet installation portion 332*a* may be arranged to be adjacent to each other, and the 2-2 magnet installation portion 342*b* and the 1-2 magnet installation portion 332*b* may be arranged to face each other. In an example, the second frame 340 may rotate together with the first frame 330 when the first frame 330 rotates.

The first driving unit 360 may include a first magnet 362 installed on either one of the housing 110 and the first frame 330 and a first coil 364 disposed to face the first magnet 362. As an example, the first magnet 362 may be installed on the first magnet installation portion 332 of the first frame 330, and the first coil 364 is installed inside the housing 110 and faces the first magnet 362. That is, the first magnet 362 may include a 1-1 magnet 362*a* installed in the 1-1 magnet installation portion 332*a* and a 1-2 magnet 362*b* installed in the 1-2 magnet installation portion 332*b*. Additionally, the first coil 364 may include a 1-1 coil 364*a* disposed to face the 1-1 magnet 362*a* and a 1-2 coil 364*b* disposed to face the 1-2 magnet 362*b*. Accordingly, when power is supplied to the first coil 364, the first frame 330 may rotate about the X-Y axis. An example in which the first magnet 362 is installed in the first frame 330 is described as an example, but is not limited thereto, and the first magnet 362 may be installed in a region disposed to face the first frame 330. In this example, the first coil 364 may be installed on the first frame 330. In an example, the first driving unit 360 may further include a yoke (not shown) that improves electromagnetic force between the first magnet 362 and the first coil 364.

The second driving unit 370 may include a second magnet 372 installed on either one of the housing 110 and the second frame 340 and a second coil 374 disposed to face the second magnet 372. As an example, the second magnet 372 may be installed on the second magnet installation portion 342 of the second frame 340, and the second coil 374 may be disposed inside the housing 110 and faces the second magnet 372. That is, the second magnet 372 may include a 2-1 magnet 372a installed in the 2-1 magnet installation portion 342a and a 2-2 magnet 372b installed in the 2-2 magnet installation portion 342b. Additionally, the second coil 374 may include a 2-1 coil 374a disposed to face the 2-1 magnet 372a and a 2-2 coil 374b disposed to face the 2-2 magnet 372b. In an example, the 2-1 magnet 372a of the second magnet 372 may be disposed between the 1-1 magnet 362a and the 1-2 magnet 362b of the first magnet 362. Additionally, the 1-1 magnet 362a of the first magnet 362 may be disposed between the 2-1 magnet 372a and the 2-2 magnet 372b of the second magnet 372. Accordingly, when power is supplied to the second coil 374, the second frame 340 may rotate about the X-Y axis. An example in which the second magnet 372 is installed in the second frame 340 is described as an example, but is not limited thereto, and the second magnet 372 may be installed in a region disposed to face the second frame 340. In this example, the second coil 374 may be installed on the second frame 340. Additionally, the second driving unit 370 may further include a yoke (not shown) that improves electromagnetic force between the first magnet 372 and the first coil 374.

Figure 11:
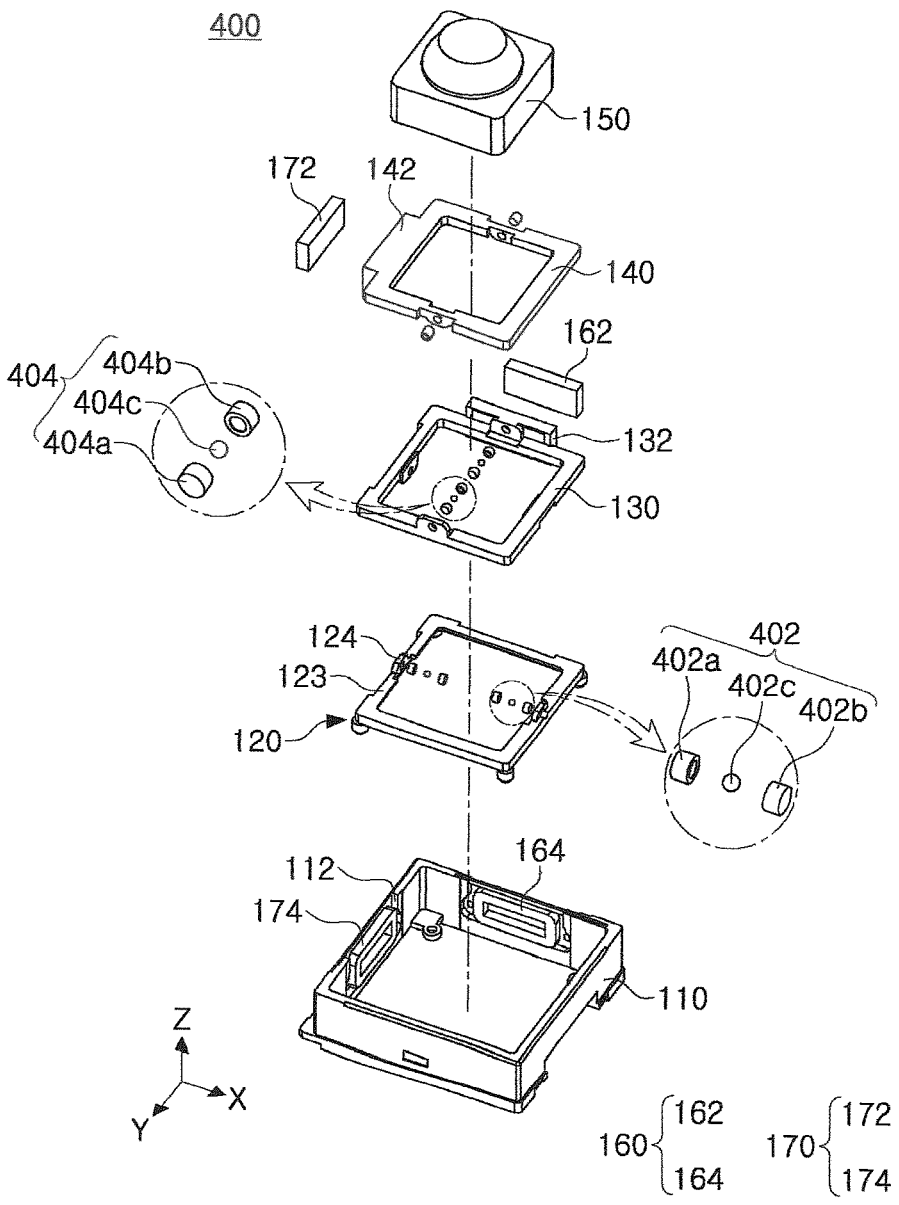
FIG. 11 is an exploded perspective view illustrating an example camera module, in accordance with one or more embodiments.

FIG. 11 is an exploded perspective view illustrating an example camera module, in accordance with one or more embodiments.

Referring to FIG. 11, an example camera module 400, in accordance with one or more embodiments, may include the housing 110, the fixed member 120, the first frame 130, the second frame 140, the lens barrel 150, the first driving unit 160, and the second driving unit 170.

In an example, the components provided in the example camera module 400 are substantially the same as the housing 110, the fixed member 120, the first frame 130, the second frame 140, the lens barrel 150, the first driving unit 160, and the second driving unit 170 provided in the camera module 100 described above, except for a first rotating shaft 402 and a second rotating shaft 404, and thus, a detailed description thereof will be omitted here and replaced with the above description.

The first rotating shaft 402 may include a 1-1 shaft 402a installed on the fixed member 120, a 1-2 shaft 402b installed on the first frame 130, and a first ball 402d disposed between the 1-1 shaft 402a and the 1-2 shaft 402b. In this manner, since the first rotating shaft 402 includes the 1-1 shaft 402a, the 1-2 shaft 402b, and the first ball 402c, the first frame 130 may rotate more smoothly.

The second rotating shaft 404 may include a 2-1 shaft 404a installed on the first frame 130, a 2-2 shaft 404b installed on the second frame 140, and a second ball 404c disposed between the 2-1 shaft 404a and the 2-2 shaft 404b. In this manner, since the second rotating shaft 404 includes the 2-1 shaft 404a, the 2-2 shaft 404b, and the second ball 404c, the second frame 140 may rotate more smoothly.

Figure 12:
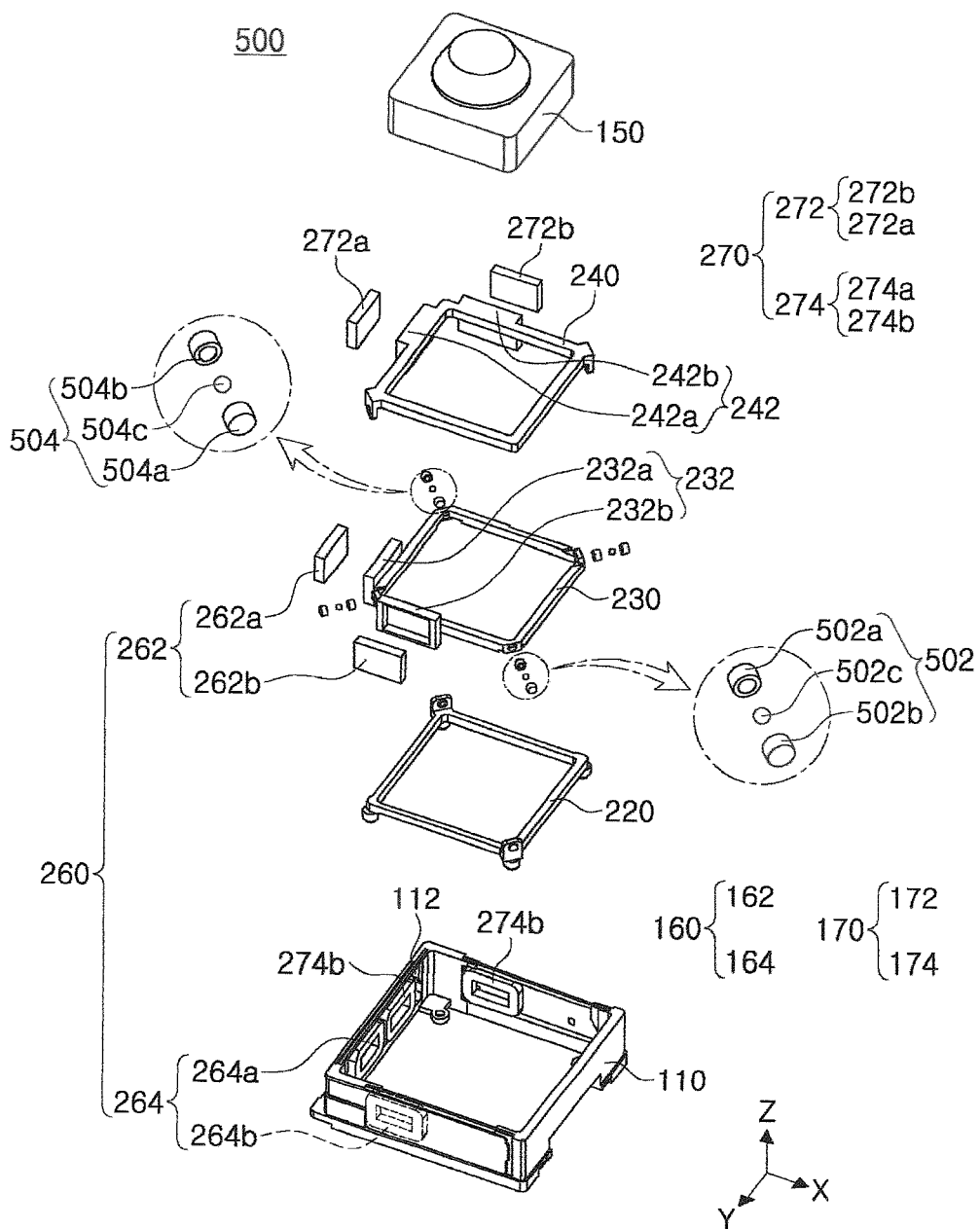
FIG. 12 is an exploded perspective view illustrating an example camera module, in accordance with one or more embodiments.

FIG. 12 illustrates an exploded perspective view illustrating an example camera module, in accordance with one or more embodiments.

Referring to FIG. 12, an example camera module 500, in accordance with one or more embodiments, may include the housing 110, the fixed member 220, the first frame 230, the second frame 240, the lens barrel 150, the first driving unit 260, and a second driving unit 270.

In an example, the components provided in the example camera module 500, in accordance with one or more embodiments, are substantially the same as the housing 110, the fixed member 120, the first frame 130, the second frame 140, the lens barrel 150, the first driving unit 160, and the second driving unit 170 provided in the camera module 200, in accordance with one or more embodiments described above, except for a first rotating shaft 502 and a second rotating shaft 504, and thus, a detailed description thereof will be omitted here and replaced with the above description.

The first rotating shaft 502 may include a 1-1 shaft 502a installed on the fixed member 220, a 1-2 shaft 502b installed on the first frame 230, and a first ball 502c disposed between the 1-1 shaft 502a and the 1-2 shaft 502b. In this manner, since the first rotating shaft 502 includes the 1-1 shaft 502a, the 1-2 shaft 502b, and the first ball 502c, the first frame 230 may rotate more smoothly.

The second rotating shaft 504 may include a 2-1 shaft 504a installed on the first frame 230, a 2-2 shaft 504b installed on the second frame 240, and a second ball 504c disposed between the 2-1 shaft 504a and the 2-2 shaft 504b. In this manner, since the second rotating shaft 504 includes the 2-1 shaft 504a, the 2-2 shaft 504b, and the second ball 504c, the second frame 240 may rotate more smoothly.

The one or more examples may have the effect of realizing miniaturization.

Additionally, the one or more examples may reduce manufacturing costs and may improve manufacturing efficiency.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A camera module comprising:

a housing;

a fixed member disposed in the housing at a fixed position relative to the housing;

a first frame rotatably disposed on the fixed member;

a second frame rotatably disposed on the first frame;

a lens barrel disposed on the second frame;

a first driving unit comprising a first magnet disposed on one of the housing and the first frame, and a first coil disposed to face the first magnet; and a second driving unit comprising a second magnet disposed on one of the housing and the second frame, and a second coil disposed to face the second magnet, wherein the first frame is configured to rotate in a first axial direction perpendicular to an incident direction of light incident on the lens barrel, and the second frame is configured to rotate in a second axial direction perpendicular to the first axial direction, and the fixed member is spaced apart from the housing and the first frame.

2. The camera module of claim 1, wherein the first frame is rotatably disposed on the fixed member via a first rotating shaft, and the first rotating shaft is disposed on a first sidewall of the first frame and a second sidewall of the first frame facing the first sidewall of the first frame.

3. The camera module of claim 2, wherein the second frame is rotatably disposed on the first frame via a second rotating shaft, and the second rotating shaft is disposed on a sidewall disposed adjacent to the first sidewall of the first frame on which the first rotating shaft is disposed, among four sidewalls of the first frame.

4. The camera module of claim 3, wherein the housing has a quadrangular frame shape.

5. The camera module of claim 4, wherein the first frame comprises a first magnet installation portion that extends into a space between the housing and the fixed member, and the first magnet of the first driving unit is disposed on an outer surface of the first magnet installation portion, and the first coil of the first driving unit is disposed on an inner surface of the housing.

6. The camera module of claim 5, wherein the second frame comprises a second magnet installation portion that extends into a space between the housing and the fixed member, and the second magnet of the second driving unit is disposed on an outer surface of the second magnet installation portion, and the second coil of the second driving unit is disposed on the inner surface of the housing.

7. The camera module of claim 6, wherein the first magnet installation portion and the second magnet installation portion are disposed on the inner surfaces of the housing, and are disposed to be adjacent to each other.

8. The camera module of claim 2, wherein the first rotating shaft comprises a 1-1 shaft disposed on the fixed member, a 1-2 shaft disposed on the first frame, and a first ball disposed between the 1-1 shaft and the 1-2 shaft.

9. The camera module of claim 3, wherein the second rotating shaft comprises a 2-1 shaft disposed on the first frame, a 2-2 shaft disposed on the second frame, and a second ball disposed between the 2-1 shaft and the 2-2 shaft.

10. An electronic device comprising the camera module of claim 1.

11. A camera module comprising:

a housing;

a fixed member fixedly disposed on the housing;

a first frame rotatably disposed on the fixed member;

a second frame rotatably disposed on the first frame;

a lens barrel disposed on the second frame;

a first driving unit comprising a first magnet, disposed on one of the housing and the first frame, and a first coil disposed to face the first magnet; and a second driving unit comprising a second magnet, disposed on one of the housing and the second frame, and a second coil disposed to face the second magnet, wherein the first frame is configured to rotate in a first axial direction, perpendicular to an incident direction of light incident on the lens barrel, and the second frame is configured to rotate in a second axial direction, perpendicular to the first axial direction, the first frame is rotatably installed on the fixed member via a first rotating shaft, and the first rotating shaft is installed at two facing corners, among four corners of the first frame.

12. The camera module of claim 11, wherein the second frame is rotatably installed on the first frame via a second rotating shaft, and the second rotating shaft is installed at corners excluding the two facing corners, among the four corners of the first frame.

13. The camera module of claim 12, wherein the housing has a quadrangular frame shape.

14. The camera module of claim 13, wherein the first frame comprises a first magnet installation portion that extends into a space between the housing and the fixed member, and the first magnet installation portion comprises a 1-1 magnet installation portion that extends from a first sidewall of the first frame, and a 1-2 magnet installation portion that extends from a sidewall disposed adjacent to the first sidewall of the first frame.

15. The camera module of claim 14, wherein the first magnet comprises a 1-1 magnet disposed in the 1-1 magnet installation portion and a 1-2 magnet disposed in the 1-2 magnet installation portion, and the first coil comprises a 1-1 coil disposed to face the 1-1 magnet and a 1-2 coil disposed to face the 1-2 magnet.

16. The camera module of claim 13, wherein the second frame comprises a second magnet installation portion that extends into a space between the housing and the fixed member, and the second magnet installation portion comprises a 2-1 magnet installation portion that extends from a first sidewall of the second frame and a 2-2 magnet installation portion that extends from a sidewall disposed adjacent to the first sidewall of the second frame.

17. The camera module of claim 16, wherein the second magnet comprises a 2-1 magnet disposed in the 2-1 magnet installation portion and a 2-2 magnet disposed in the 2-2 magnet installation portion, and the second coil comprises a 2-1 coil disposed to face the 2-1 magnet and a 2-2 coil disposed to face the 2-2 magnet.

18. A camera module comprising:

a housing;

a fixed member disposed in the housing at a fixed position relative to the housing;

a first frame configured to tilt in a first direction relative to the fixed member;

a second frame configured to tilt in a second direction perpendicular to the first direction;

a lens barrel fixed to the second frame and configured to rotate with the second frame;

a first driving unit configured to tilt the first frame in the first direction and comprising a first magnet disposed on the first frame, and a first coil disposed on the housing; and a second driving unit configured to tilt the second frame in the second direction and comprising a second magnet disposed on the second frame, and a second coil disposed on the housing, wherein the fixed member is spaced apart from the housing and the first frame.

19. An electronic device comprising the camera module of claim 18.

* * * * *